Patented Mar. 5, 1946

2,395,930

UNITED STATES PATENT OFFICE 2,395,930

PROCESS FOR REACTING KETENE AND HYDROCYANIC ACID

Franklin Johnston, St. Albans, and Lawrence W. Newton, South Charleston, W. Va., assignors to Carbide and Carbon Chemicals Corporation, a corporation of New York No Drawing. Application February 12, 1944, Serial No. 522,174

10 Claims. (Cl. 260—464)

This invention relates to the production of organic derivatives of hydrocyanic acid; and more especially it concerns the production of such derivatives by reactions involving hydrocyanic acid and ketene in the presence of a small amount of a basic condensation catalyst or reaction promoter of the type hereinafter described. The invention has especial utility for the production from ketene and hydrocyanic acid of 1-cyanovinyl acetate and/or the dimer of acetyl cyanide commonly designated dimolecular acetyl cyanide.

In the past 1-cyanovinyl acetate has been produced experimentally in the laboratory in small yields of less than 15% by mixing ketene with twice its volume of anhydrous hydrocyanic acid in a sealed pressure tube at temperatures below 0° C., and shaking the mixture while it is allowed to come to room temperature. The resultant reaction products included diketene, dehydracetic acid and various resinous polymerization products. The reaction was conducted in the absence of catalysts and of solvents for the reactants.

Dimolecular acetyl cyanide has heretofore been produced (1) by reacting hydrocyanic acid with acetic anhydride at about 200° C.; (2) by treating acetyl cyanide with metallic sodium; and (3) by reacting potassium cyanide in benzene solution with acetic anhydride.

The present invention is based in important part upon the discovery that 1-cyanovinyl acetate and/or dimolecular acetyl cyanide can be produced in good yields by reacting ketene and dry hydrocyanic acid, preferably in the proportions of from 2 to 3 mols of the former per mol of the latter, at temperatures within the range between about −50° C. and about 30° C., in the presence of a basic catalyst or reaction promoter which does not react with ketene to form non-basic products under the conditions of the aforesaid reaction.

Our experiments lead to the conclusion that basic substances in general are effective catalysts for the reaction, provided, of course, that they remain basic under the conditions of the reaction. Thus a basic substance is suitable unless it reacts with ketene to form a non-basic product. Tertiary amines are suitable because they do not react readily with ketene at the temperatures used in this invention, but ammonia, primary, and secondary amines are less desirable or useless because they react readily with ketene, forming non-basic amides. Sodium hydroxide is suitable, although it reacts with ketene, because sodium acetate, so formed, is basic, whereas calcium hydroxide has little or no value in the present invention, because calcium acetate is not basic, at least as this term is commonly employed, and any basicity which it may have is too little to be of practical value in the present invention.

We have tried many basic substances which do not react with ketene to form non-basic products and have found that all such substances which we have tried catalyze the reaction. Among basic substances which function effectively to catalyze the reaction may be mentioned the tertiary aliphatic and aromatic amines; the quaternary ammonium bases; the alkali metal hydroxides, alkoxides, aryloxides, amides and cyanides; and the alkali metal salts of organic and weak inorganic acids. Examples of such reaction promoters include triethyl amine, triethanolamine, pyridine, tetraethanolammonium hydroxide, trimethylbenzylammonium hydroxide, sodium and potassium hydroxides, sodium methylate, potassium ethylate, and sodium alcoholates derived from hexanol, octanol and the various glycol mono-ethers, sodium phenate, sodium naphthalene, sodium amide, potassium cyanide, sodium acetate and the sodium and potassium salts of other fatty acids, sodium carbonate, potassium borate and sodium silicate.

The reactions involved in producing 1-cyanovinyl acetate appear to be:

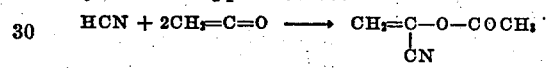

The mechanism of the reactions forming the dimer of acetyl cyanide is probably as follows:

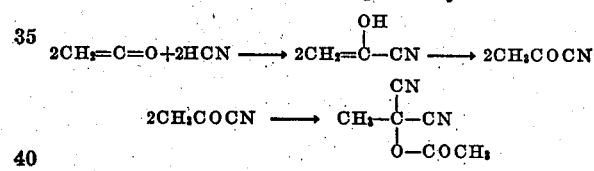

The mechanism of the reaction forming the dimer at the expense of the 1-cyanovinyl acetate upon neutralization of the reaction mixture from the catalyzed reaction may be:

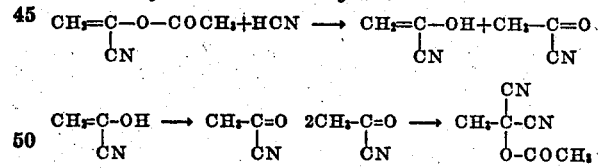

It will be understood that the invention is not to be limited by any theory as to the reactions involved in the production of these compounds.

Among catalysts suitable for use with the invention may be mentioned such tertiary amines as triethylamine, triethanolamine, triisopropanolamine, pyridine, the N-substituted morpholines such as N,2-cyanoethyl morpholine, etc. The quaternary ammonium bases may include compounds of the type $NRR^1R^2R^3OH$ wherein R, $R^1$, $R^2$ and $R^3$, respectively, may be the same alkyl or aryl radical, or different alkyl or aryl radicals. Examples are tetraethylammonium hydroxide, tetraethanolammonium hydroxide, and trimethylbenzylammonium hydroxide.

In accordance with the invention, ketene is condensed with dry hydrocyanic acid, at temperatures between about $-50°$ C. and about $+30°$ C., and preferably at temperatures within the range between about $-20°$ C. and about $+10°$ C., in the presence of a small amount of a basic catalyst such as those of the type hereinbefore described. The use of the higher temperatures, for example those around $10°$ C. to $30°$ C., favors the production of the acetyl cyanide dimer.

The condensation reaction preferably is conducted in the presence of an anhydrous volatile organic solvent or diluent for the reactants and the catalyst. A suitable solvent desirably is one that is inert to the reactants and to the catalyst; however, even solvents containing active groups, such as acetone and methyl acetate, are successfully used. Among solvents advantageously employed in the process may be mentioned organic acid anhydrides such as acetic anhydride; the aliphatic ethers, such as diethyl ether and dioxane; esters of carboxylic acids such as methyl acetate, ethylacetate and 1-cyanovinyl acetate; ketones such as acetone; and mixtures of one or more of these solvents with acetic anhydride.

The use of acetic anhydride alone as a solvent or diluent in the reaction mixture is particularly advantageous and tends to provide almost quantitative yields of the 1-cyanovinyl acetate. When used in conjunction with other volatile solvents or with inert diluents, about 10% by weight of the acetic anhydride conveniently may be employed. 1-cyanovinyl acetate may be used effectively as the solvent or diluent; and especially good results are secured when using as solvent a mixture containing that compound mixed with from about 10% to 20% of its weight of acetic anhydride. Similarly, an excess of hydrocyanic acid may be employed, in which case the excess acid functions as a volatile solvent or diluent.

The condensation reaction between the ketene and hydrocyanic acid may be effected by slowly introducing a stream of ketene vapors into an agitated body of anhydrous hydrocyanic acid which contains the catalyst, and which preferably is in solution in a volatile solvent for the reactants and catalysts.

After the absorption of the requisite amount of ketene, the reaction mixture may be fractionally distilled under subatmospheric pressure in a suitable column still. The 1-cyanovinyl acetate and/or the dimolecular acetyl cyanide, and any unreacted hydrocyanic acid and volatile solvent, are separately recovered.

The ketene and hydrocyanic acid may very advantageously be introduced concurrently, preferably in a ratio of between 2 and 3 mols of the former to one mol of the latter, into a solution of the catalyst in a volatile solvent for the reactants. The resultant reaction mixture, after absorption of the required amount of ketene, is fractionally distilled under vacuum in the manner previously indicated for the isolation and recovery of the desired reaction products and any unreacted hydrocyanic acid and solvent.

By neutralizing the condensation reaction mixture with a suitable inorganic or organic acid, such as acetic acid or sulfuric acid, prior to the fractional distillation thereof, the yield of dimolecular acetyl cyanide may be greatly increased at the expense of the 1-cyanovinyl acetate. When the reaction mixture is not neutralized prior to such distillation, the amount of the dimer is much smaller, and sometimes may be insufficient in amount to permit isolation thereof.

In the following examples, which serve to illustrate the invention, the yields recited are based upon the hydrocyanic acid used:

Example 1

One hundred and seventy eight grams of ketene were slowly introduced into 81 grams of anhydrous hydrocyanic acid containing 3 cc. of pyridine as catalyst, while maintaining the mixture of reactants at about $-20°$ C. After absorption of the ketene was completed, the reaction mixture was fractionally distilled under vacuum through a short column. A 36% yield of 1-cyanovinyl acetate was secured as a fraction boiling at between 104 and 107° C. under an absolute pressure of 100 mm. of mercury, and was separately recovered. A yield of 32% of dimolecular acetyl cyanide also was recovered as a fraction boiling at 80° C. under an absolute pressure of 4 mm. of mercury.

Example 2

Following the general procedure described in Example 1, 295 grams of ketene were introduced into a mixture of 81 grams of anhydrous hydrocyanic acid, 3 cc. of triethylamine and 300 cc. of anhydrous diethyl ether, while maintaining the reaction mixture at $-50°$ C. Fractional distillation of the resultant reaction mixture under vacuum resulted in the recovery of a yield of 50% of 1-cyanovinyl acetate as a fraction boiling between 104° and 107° C. under an absolute pressure of 100 mm. of mercury, and a yield of 41% of dimolecular acetyl cyanide as a fraction boiling at 80° C. under an absolute pressure of 4 mm. of mercury. Thus, a total yield of 91% of these products was secured.

Example 3

During a 4.5 hours period, 226 grams of ketene were slowly introduced into a mixture of 300 cc. of anhydrous diethyl ether, 81 grams of hydrocyanic acid and 1 cc. of triethylamine, maintained at a reaction temperature of about 0° C. The reaction mixture and basic catalyst were then neutralized by adding thereto one gram of glacial acetic acid. The neutralized reaction mixture was then fractionally distilled under vacuum in the general manner described in Example 1, yielding 149 grams of dimolecular acetyl cyanide and 27 grams of 1-cyanovinyl acetate, corresponding to yields, respectively, of 72% and 8%.

Example 4

Following the general procedure described in Example 2, but substituting as the catalyst 1 cc. of triisopropanolamine, there was secured upon fractional distillation of the reaction mixture a substantially smaller yield of distilled 1-cyanovinyl acetate. Some unreacted hydrocyanic acid was recovered.

Example 5

Ketene and anhydrous hydrocyanic acid were concurrently introduced slowly over a period of about two hours into 300 cc. of acetic anhydride containing 3 cc. of triethanolamine and maintained at 0° C. From 296 grams of ketene and 81 grams of hydrocyanic acid there were obtained upon fractional distillation of the resultant reaction mixture 289 grams of 1-cyanovinyl acetate and 10 grams of dimolecular acetyl cyanide, corresponding to yields of 87% and 5% of these products, respectively.

Example 6

Ketene and anhydrous hydrocyanic acid were concurrently introduced into a mixture of 300 cc. of acetic anhydride containing 1 cc. of triethanolamine maintained at temperatures ranging from 22° to 31° C. From 264 grams of ketene and 81 grams of hydrocyanic acid introduced over a period of five hours, there were secured, upon fractional distillation of the reaction mixture, a 65% yield of 1-cyanovinyl acetate and a 28% yield of dimolecular acetyl cyanide.

Under similar operating conditions but using 3 cc. of the triethanolamine, and methyl acetate as the solvent, somewhat lower yields of 1-cyanovinyl acetate and dimolecular acetyl cyanide, in approximately the same proportions, were secured. Substituting dioxane for the methyl acetate gave closely similar results.

Example 7

Ketene and anhydrous hydrocyanic acid were concurrently introduced slowly over a period of about three hours into a mixture of 266 grams of 1-cyanovinyl acetate, 34 grams of acetic anhydride and 1 cc. of triethanolamine, while maintaining the mixture of reactants at 0° C. Upon fractional distillation under vacuum of the reaction mixture thus obtained from 269 grams of ketene and 81 grams of hydrocyanic acid, 540 grams of 1-cyanovinyl acetate were recovered, establishing that 274 grams thereof had been produced in the process. This corresponds to a yield of 82% thereof. Seven grams of unreacted hydrocyanic acid were recovered.

Example 8

One hundred and ninety seven grams of ketene and 54 grams of anhydrous hydrocyanic acid were slowly added over a period of one hour to a mixture of 250 cc. of ethyl ether, 30 cc. of acetic anhydride and 1 cc. of tetraethanolammonium hydroxide maintained at —5° C. Fractional distillation of the resultant reaction mixture under vacuum in the general manner described in Example 1 yielded 1-cyanovinyl acetate in amount corresponding to a yield of 98%.

Under generally similar operating conditions but using 1 cc. of trimethylbenzylammonium hydroxide as the catalyst, a somewhat lower yield of 1-cyanovinyl acetate was secured.

Example 9

Ketene and anhydrous hydrocyanic acid were slowly added over 1.5 hours to a mixture of 250 cc. of ethyl ether, 30 cc. of acetic anhydride and 1 gram of sodium methylate maintained at —5° C. The reaction mixture was fractionated in the manner indicated in Example 1. From 226 grams of ketene and 54 grams of hydrocyanic acid there were obtained 186.5 grams of 1-cyanovinyl acetate, corresponding to a yield of 84%.

Under generally similar operating conditions but using sodium phenate as the catalyst, similar results are obtained.

Example 10

During a period of 1.25 hours, 211 grams of ketene and 54 grams of anhydrous hydrocyanic acid were added in small increments to a solution of 250 cc. ethyl ether, 30 cc. acetic anhydride, and 3 grams of sodium amide, maintained at —3° C. A yield of 83% of 1-cyanovinyl acetate was obtained by fractional distillation of the reaction mixture.

Example 11

Fifty four grams of dry hydrocyanic acid were added dropwise during 1.25 hours to a mixture of 250 cc. of ethyl ether, 30 cc. of acetic anhydride and 3 grams of potassium acetate maintained at —4° C., while passing 259 grams of ketene into the mixture. Distillation of the crude reaction mixture yielded 85% of 1-cyanovinyl acetate. Alternatively, potassium hydroxide may replace potassium acetate as the added catalyst with equivalent results.

Example 12

During 2.5 hours 345 grams of ketene and 81 grams of dry hydrocyanic acid were added to a mixture of 300 cc. of ethyl ether, and 6 cc. of N,2-cyanoethyl morpholine maintained at approximately —45° C. Fractional distillation of the resultant reaction mixture gave a 75% yield of 1-cyanovinyl acetate and a 9% yield of dimolecular acetyl cyanide.

Example 13

During a period of one hour, 197 grams of ketene and 54 grams of dry hydrocyanic acid were added to a mixture of 250 cc. of ethyl ether, 30 cc. of acetic anhydride and one gram of potassium cyanide maintained at —5° C. The resultant reaction mixture upon distillation gave a yield of 71% of 1-cyanovinyl acetate.

Example 14

Under substantially the same conditions described in Example 9, but substituting 3 grams of potassium naphthalene for the one gram of sodium methylate, a yield of 54% of 1-cyanovinyl acetate was secured.

The preparation of potassium naphthalene and similar alkali metallates is described in Journal of the American Chemical Society, volume 58, page 2442; and in United States Patent No. 2,019,832.

The results of extensive experimental work has established that neither 1-cyanovinyl acetate nor dimolecular acetyl cyanide can be produced by reacting ketene and hydrocyanic acid in the presence of a solvent for the reactants but in the absence of a catalyst. Thus, upon slowly adding 81 grams of hydrocyanic acid and 265 grams of ketene to 300 cc. of acetic anhydride over a period of 3.5 hours at a temperature of 0° C., and allowing the mixture to stand for 16 hours packed in solid carbon dioxide,—all of the hydrocyanic acid was recovered unreacted upon distillation of the reaction mixture. Increasing the amount of ketene used and the time for the reaction did not change this result. (Compare the catalyzed reaction of Example 5.)

The 1-cyanovinyl acetate produced by this invention is a water-white, mobile liquid with a sharp odor. It boils between 104–107° C. under an absolute pressure of 100 mm. of mercury; and has a specific gravity at 20/20° C. of 1.063; and a refractive index at 20° C. of 1.4253.

The dimolecular acetyl cyanide is a white, crystalline solid melting at 70° C. to form a liquid which boils at 76–77° C. under an absolute pressure of 3 mm. of mercury.

The chief use of 1-cyanovinyl acetate appears to be as a copolymer in the polymerization of various unsaturated compounds. The dimolecular acetyl cyanide has apparent value in the preparation of unsaturated cyanides, and of certain amines and dibasic organic acids.

The invention is susceptible of modification within the scope of the appended claims.

We claim:

1. Process which comprises introducing successive portions of ketene into a liquid body maintained at a temperature within the range between about −50° C. and about +30° C., and containing dry hydrocyanic acid and a basic condensation catalyst which under the conditions of the condensation does not substantially react with ketene to form non-basic reaction products, and recovering from the resultant reaction mixture at least one member of the group consisting of 1-cyanovinyl acetate and dimolecular acetyl cyanide present therein.

2. Process which comprises introducing successive portions of ketene into a liquid body containing dry hydrocyanic acid, a tertiary amine catalyst and an anhydrous volatile solvent for the reactants, and maintained at a temperature between around −50° C. and around +30° C., and recovering from the resultant reaction mixture at least one member of the group consisting of 1-cyanovinyl acetate and dimolecular acetyl cyanide.

3. Process which comprises introducing successive portions of ketene into a liquid body containing dry hydrocyanic acid, a quaternary ammonium base, and an anhydrous volatile solvent for the reactants, and maintained at a temperature between around −50° C. and around +30° C., and recovering from the resultant reaction mixture at least one member of the group consisting of 1-cyanovinyl acetate and dimolecular acetyl cyanide.

4. Process which comprises introducing successive portions of ketene into a substantially dry liquid body maintained at a temperature between around −50° C. and +30° C., and containing substantially dry hydrocyanic acid, a basic condensation catalyst which under the conditions of the condensation does not substantially react with ketene to form non-basic reaction products, and an anhydrous volatile solvent for the reactants, and recovering from the resultant reaction mixture at least one member of the group consisting of 1-cyanovinyl acetate and dimolecular acetyl cyanide thereby produced.

5. Process as defined in claim 4 wherein the solvent comprises acetic anhydride.

6. Process which comprises slowly and concurrently introducing successive portions of ketene and dry hydrocyanic acid into a solution in an anhydrous volatile solvent for the ketene and hydrocyanic acid of a basic catalyst for the resultant condensation between the ketene and hydrocyanic acid, which catalyst does not substantially react with ketene to form non-basic reaction products under the conditions of the said condensation reaction, while maintaining said solution at a temperature within the range between about −50° C. and about +30° C., and separately recovering from the resultant reaction mixture at least one of the resultant reaction products selected from the group consisting of 1-cyanovinyl acetate and dimolecular acetyl cyanide.

7. Process which comprises slowly and concurrently introducing successive portions of ketene and dry hydrocyanic acid in the ratio of between 2 and 3 mols of the ketene per mol of the said acid into a solution of a basic alkali metal compound in an anhydrous volatile solvent for the ketene and hydrocyanic acid, which basic compound does not substantially react with ketene to form non-basic reaction products under the conditions of the resultant reaction between the ketene and hydrocyanic acid, said solution being maintained at a temperature within the range between about −50° C. and about +30° C., and separately recovering from the resultant reaction mixture at least one of the resultant reaction products selected from the group consisting of 1-cyanovinyl acetate and dimolecular acetyl cyanide.

8. Process which comprises slowly and concurrently introducing successive portions of ketene and dry hydrocyanic acid in the ratio of between 2 and 3 mols of the ketene per mol of the said acid into a solution of a tertiary amine in an anhydrous volatile solvent for the ketene and hydrocyanic acid, said solution being maintained at a temperature within the range between about −50° C. and about +30° C., and separately recovering from the resultant reaction mixture at least one of the resultant reaction products selected from the group consisting of 1-cyanovinyl acetate and dimolecular acetyl cyanide.

9. Process which comprises slowly and concurrently introducing successive portions of ketene and dry hydrocyanic acid in the ratio of between 2 and 3 mols of the ketene per mol of the said acid into a solution of a quaternary ammonium base in an anhydrous volatile solvent for the ketene and hydrocyanic acid, said solution being maintained at a temperature within the range between about −50° C. and about +30° C., and separately recovering from the resultant reaction mixture at least one of the resultant reaction products selected from the group consisting of 1-cyanovinyl acetate and dimolecular acetyl cyanide.

10. Process which comprises slowly and concurrently introducing successive portions of ketene and dry hydrocyanic acid in the ratio of between 2 and 3 mols of the ketene per mol of the said acid into a solution of an alkali metal cyanide in an anhydrous volatile solvent for the ketene and hydrocyanic acid, said solution being maintained at a temperature within the range between about −50° C. and about +30° C., and separately recovering from the resultant reaction mixture at least one of the resultant reaction products selected from the group consisting of 1-cyanovinyl acetate and dimolecular acetyl cyanide.

FRANKLIN JOHNSTON.
LAWRENCE W. NEWTON.